United States Patent [19]

Poland

[11] Patent Number: 4,640,501
[45] Date of Patent: Feb. 3, 1987

[54] HOLDING FIXTURE

[75] Inventor: David A. Poland, Hawthorne, Calif.

[73] Assignee: Northrop Corporation, Hawthorne, Calif.

[21] Appl. No.: 728,430

[22] Filed: Apr. 29, 1985

[51] Int. Cl.[4] ............................................. B25B 11/00
[52] U.S. Cl. ..................................................... 269/21
[58] Field of Search .................... 269/20, 21, 311, 312, 269/313, 314

[56] References Cited

U.S. PATENT DOCUMENTS

| | | | |
|---|---|---|---|
| 3,652,075 | 3/1972 | Thompson | 269/21 |
| 3,853,313 | 12/1974 | Appenzeller et al. | 269/21 |
| 4,088,312 | 5/1978 | Frosch et al. | 269/21 |
| 4,468,017 | 8/1984 | Pavone | 269/21 |
| 4,527,783 | 7/1985 | Collora et al. | 269/21 |

Primary Examiner—Frederick R. Schmidt
Assistant Examiner—Judy J. Hartman
Attorney, Agent, or Firm—Terry J. Anderson; Michael B. Lachuk

[57] ABSTRACT

A hollow base member has a working surface and a plurality of spaced apart ways all extending parallel to an x-axis of a cartesian coordinate system. A plurality of hollow positioning members are slidably received in the ways. A plurality of vacuum hold down members are slidably sealingly received within bores in the base member and in the positioning members, respectively, and move along lines parallel to the z-axis relative to the working surfaces. A work piece is placed on a plurality of the hold down members which establish its position in the z-direction, then advanced against stop members fixed to the base member to establish its position along the y-axis. Then the positioning members are slid in the ways until integral stop members engage the work piece to establish a plurality of positions along the x-axis and within an xy-plane of the coordinate system. Vacuum applied to the hold down members from the interior of the base member and each of the positioning members rigidly holds the work piece in position for machining operations. Numerically controlled machinery can accurately and rapidly perform the desired operations.

8 Claims, 4 Drawing Figures

HOLDING FIXTURE

BACKGROUND OF THE INVENTION

1. Field of Invention

The present invention relates generally to holding fixtures to enable machining operations to be accurately performed on a work piece. Specifically, the invention enables machining operations to be accurately and repeatedly performed on different types of successive work pieces while requiring a minimum of set-up time.

2. Description of the Prior Art

In many instances, the shapes of structural assemblies for the fuselage and airfoils of modern aircraft are of highly irregular and complicated shapes. This frequently results from attempts to achieve optimum aerodynamic efficiency. At the same time, it often occurs that by reason of a relatively small production run of the item, there is an insufficient quantity of the item being produced to warrant the hard tooling which would otherwise be necessary for machining operations. It will be appreciated that the time and expense involved in providing hard tooling can be very great indeed.

Therefore, previously, it was the custom when small production runs were called for, to perform manually such machining operations as sawing, milling, grinding, and drilling. Unfortunately such operations were necessarily performed with substantial loss of time, and in some instances, accuracy and repeatability. Often times, the work piece would be manually and visually placed on the work surface of the machine tool, then clamped into position until all operations have been completed. The clamp itself, in order to securely hold the work piece, sometimes undesirably deformed the work piece in an effort to prevent movement during the machining operation. Also, the clamp was subject to inaccuracies and with wear after a time might no longer rigidly hold the work piece. It was with recognition of these and other drawbacks of the prior art that the present invention was conceived and has now been reduced to practice.

SUMMARY OF THE INVENTION

To this end, a holding fixture has been devised which enables machining operations to be accurately and repeatedly performed on different types of successive work pieces requiring a minimum of set-up time. By reason of the invention, machining operations can be accurately performed on a work piece and such operations can be accurately and repeatedly performed on different types of successive work pieces. According to the invention, the holding fixture comprises a hollow base member with a working surface and a plurality of spaced apart ways all extending parallel to an x-axis of a cartesian coordiante system. A plurality of hollow positioning members are slidably received in the ways and have working surfaces coplanar with the working surfaces of the base member. A plurality of vacuum hold down members are slidably sealingly received within the bores in the base member and in the positioning members, respectively and move along a z-axis relative to the working surfaces.

A work piece is placed on a plurality of the hold down members which establish its position along a z-axis, then is advanced against stop members fixed to the base member to establish its position along a y-axis. Then the positioning members are slid in the ways until integral stop members engage the work piece to establish a plurality of positions along the x-axis and within the space above the xy-plane of the cartesian coordinate system wherein the holding fixture resides.

Vacuum applied to the hold down members from the interior of the base member and each of the positioning members rigidly holds the work piece in position for machining operations. When machining operations are completed, the vacuum can be withdrawn, the work piece removed, and a successive work piece identically positioned on the holding fixture. Numerically controlled machinery, being informed of the position of the work piece on the holding fixture, can then accurately and rapidly perform the desired operations.

In keeping with a preferred use of the holding fixture with conjunction with numerically controlled machinery, it is preferred to arrange the bores in the base members and in each of the positioning member equally spaced and in the form of a regular matrix aligned with the x- and y-axes, respectively, when each of the positioning members is in a rest position. Also, it is preferred that the outer rim of each of the hold down members be provided with seal means which resiliently and sealingly engage the work piece placed on the holding fixture. Seal means are also provided between the hold down members and their associated base member or positioning members to assure the vacuum integrity of the system regardless of movement of the hold down members. The stop members which establish the position of the work piece along the x- and y-axes are preferably removably mounted to the positioning members and to the base member, respectively, and can be appropriately of different shapes to accommodate the particular shape of the work piece.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms.

DETAILED DESCRIPTION OF THE DRAWINGS

Figure 1:
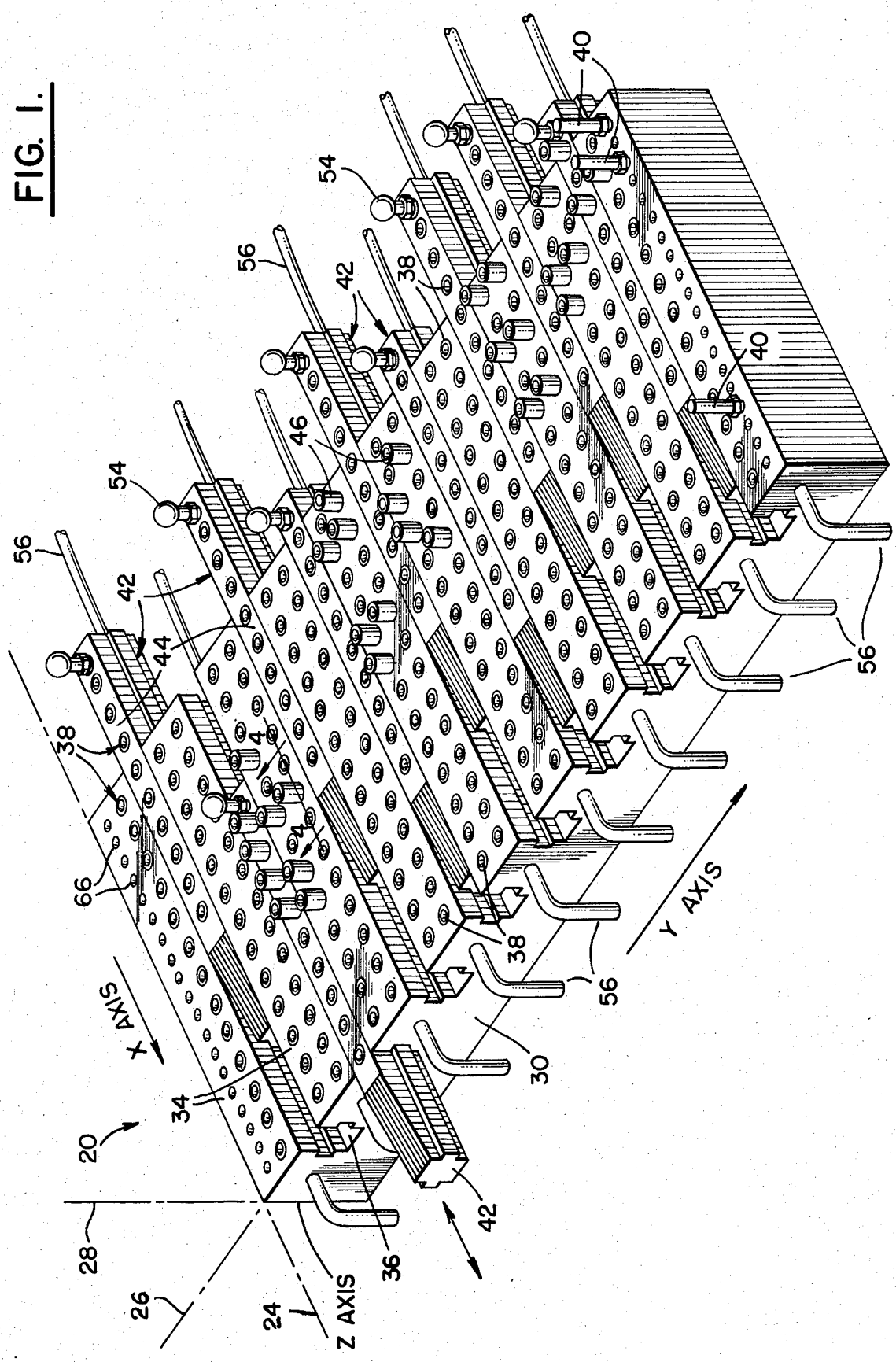
Figure 2:
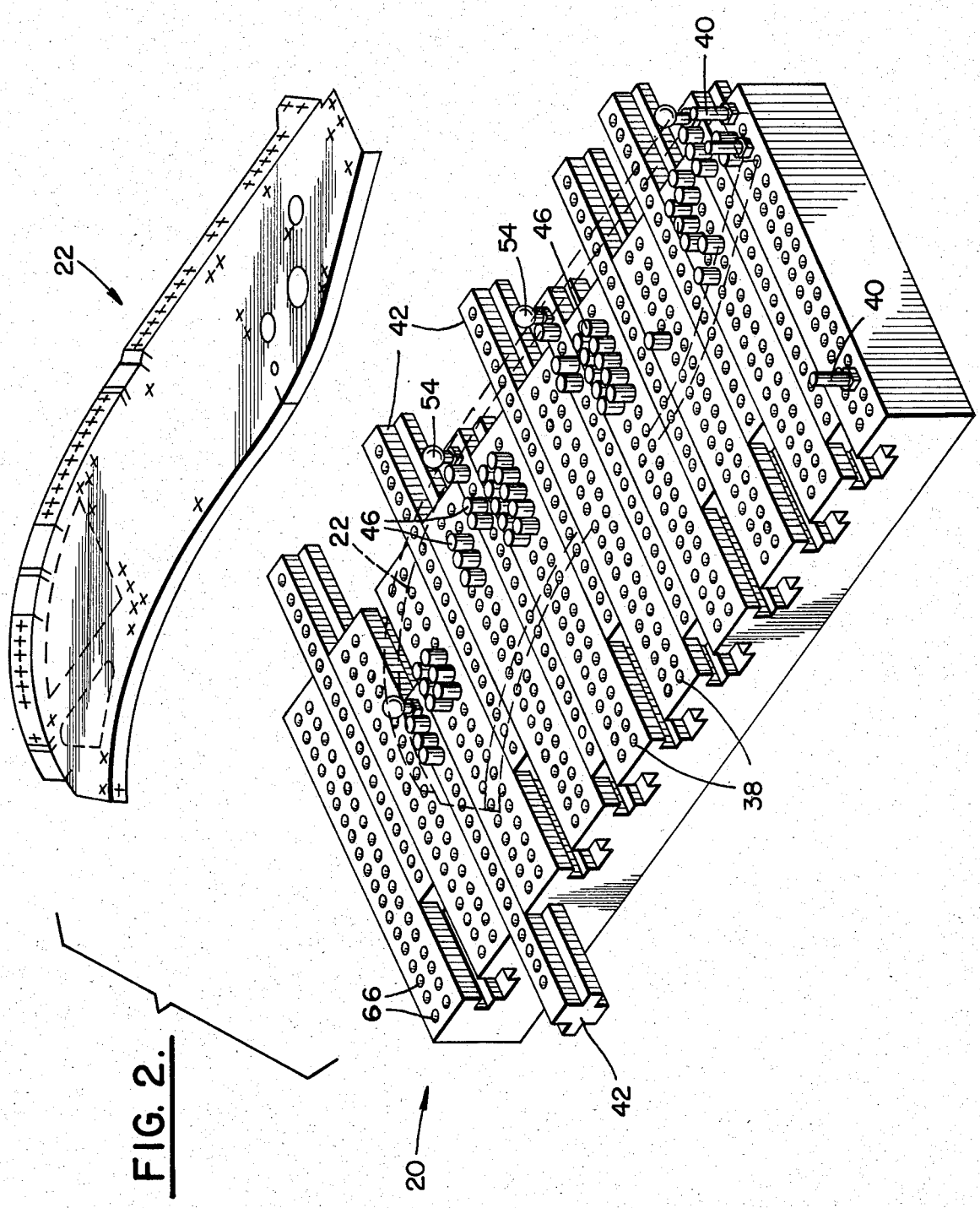
Figure 3:
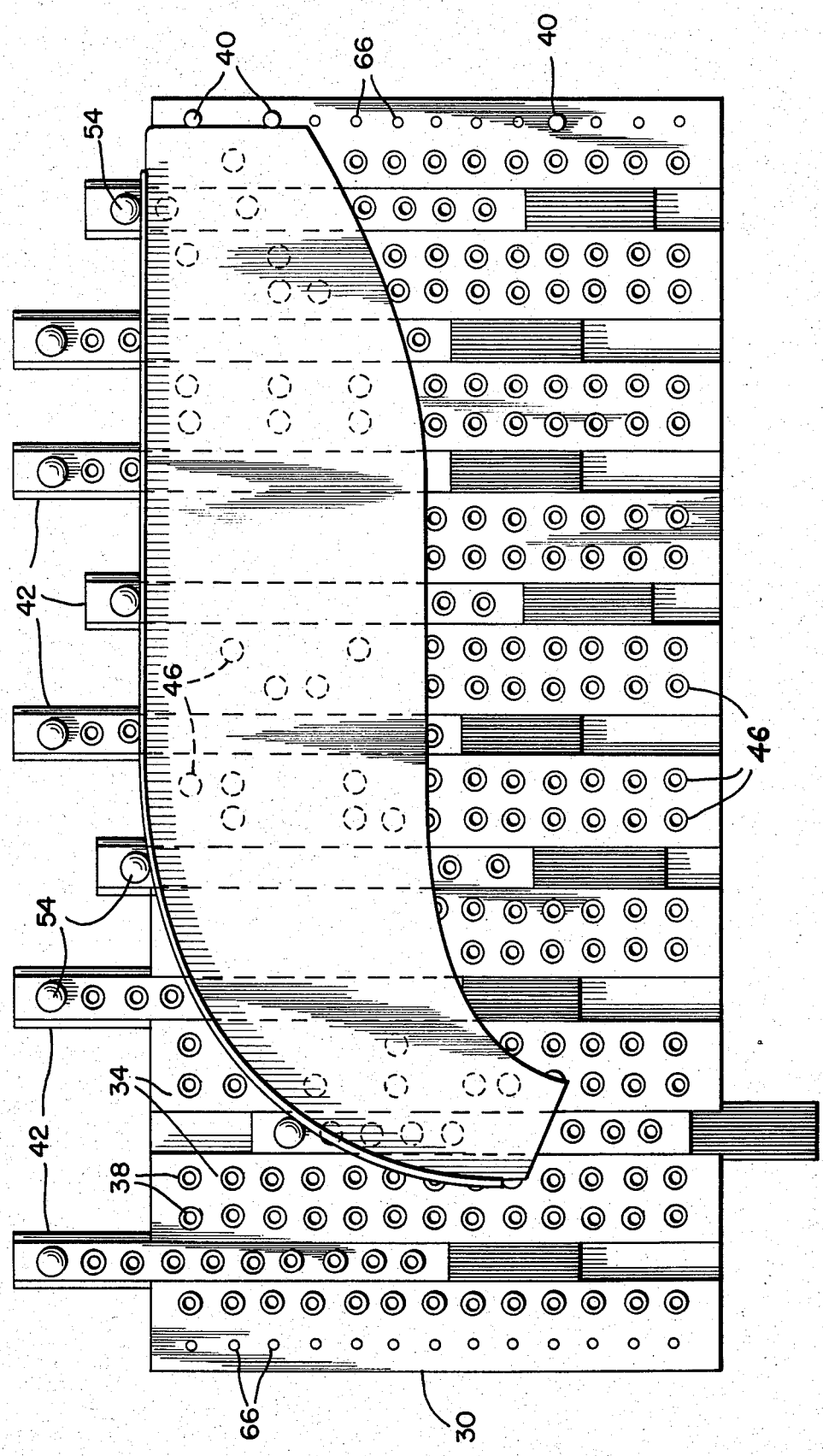
Figure 4:
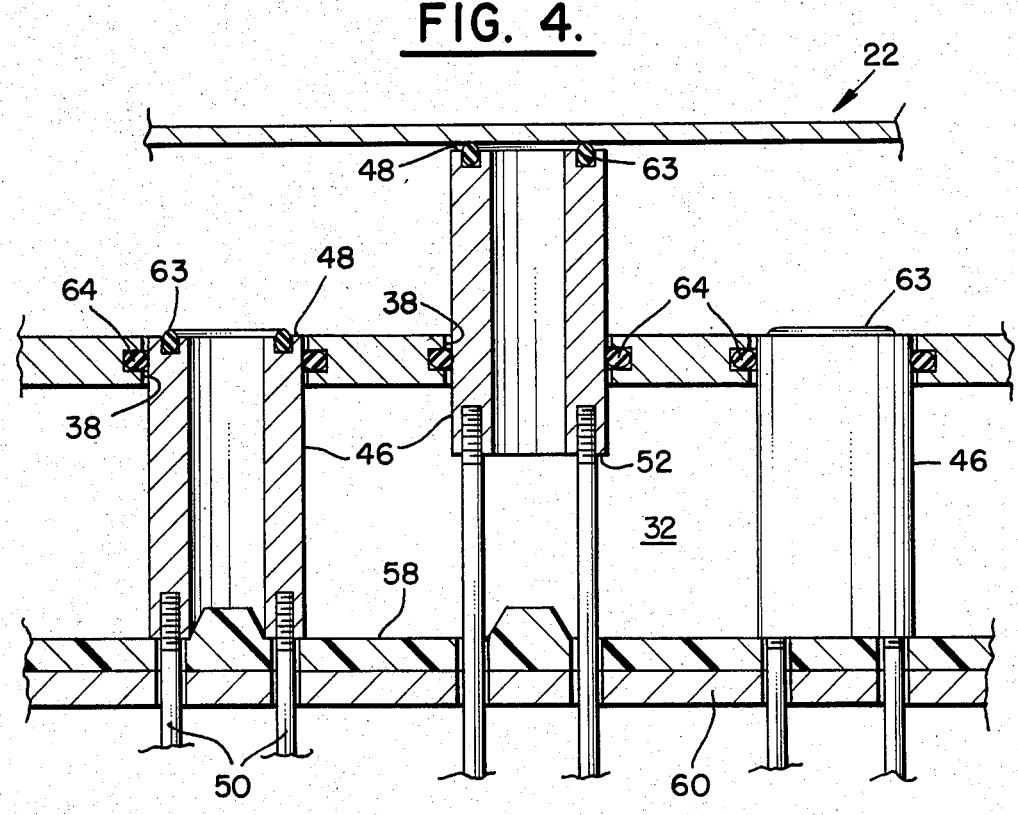

In the drawings:

FIG. 1 is a perspective view of a holding fixture incorporating the features of the present invention;

FIG. 2. is a perspective view illustrating a work piece to be mounted on the holding fixture of FIG. 1 in order for a series of machining operations to be performed on the work piece while it is so mounted;

FIG. 3 is a plan view illustrating the holding fixture and the work piece in position on the holding fixture awaiting the beginning of the machining operations; and FIG. 4 is a detailed cross-section view taken generally along line 4—4 in FIG. 1.

DESCRIPTION OF THE PREFERRED EMBODIMENT

Refer now to the drawings and initially to FIGS. 1, 2, and 3. These figures generally illustrate a holding fixture 20 which embodies the principles of the present invention and a typical work piece 22 which is to be held by the holding fixture to enable a series of machining operations to be performed thereon. In accordance with the invention, a holding fixture is disclosed capable of positioning an irregularly shaped article in a cartesian coordinate system. The holding fixture also holds the article immobile to enable machining operations to be accurately and repeatedly performed on successive articles. In general, it comprises a base member which is hollow to define a chamber therein, has a working surface and a plurality of spaced apart, recessed, ways extending parallel to an x-axis of the coordinate system. The base member also has a plurality of bores extending between the working surface and the chamber and includes stop means fixed on the base member engageable by the article for defining the position of the article along a y-axis of the coordinate system.

A plurality of positioning members are provided, each of which is slidably received in the ways and movable between a rest position and active positions. Each of the positioning members is hollow like the base member to define a cavity therein, has a working surface generally coplanar with the working surface of the base member and is provided with a plurality of bores extending between the working surface and the cavity.

Also, a plurality of vacuum hold down members are slidably received within the bores in the base member and within the bores in each of the positioning members. The hold down members are tubular and terminate at an outer rim, each being movable along a different line parallel to the z-axis of the coordinate system between a retracted position with the outer rim being generally flush with the working surface of the base member and of the positioning members and an extended position spaced from the bores and the working surfaces. The outer rims of a predetermined plurality of the hold down members are adapted to supportingly engage the article thereon and thereby define the position of the article in the z-direction at a plurality of spaced locations in the xy-field of the coordinate system.

Further, second stop means are mounted on each of the positioning members. Movement of each of the second stop means is interrupted by engagement with the article when the associated positioning member is slid along its way toward the article which is supportingly engaged on the hold down members. The plurality of the second stop members thereby define the position of the article in the x-direction at a plurality of spaced locations in the y-direction of the coordinate system.

The fixture also includes a source of vacuum to the chamber and to the cavity. The hold down members are connected with the vacuum when they are in the extended position to thereby hold immobile the article supportingly engaged thereon. Conversely, the hold down member are disconnected from the vacuum when they are in the retracted positions.

As embodied herein, and with continuing reference to FIGS. 1–3, it will be seen that the holding fixture 20 is of such a design as to be capable of positioning an irregularly shaped article, such as a work piece 22, in a cartesian coordinate system represented by an x-axis 24, a y-axis 26 and a z-axis 28. Once the work piece 22 is properly positioned, the holding fixture 20 renders the work piece immobile to enable machining operations to be commenced in a manner which will assure their accuracy as well as repeatability on successive work pieces.

The holding fixture 20 includes a base member 30 which is hollow so as to define a chamber 32 (see FIG. 4). The base member 30 also is provided with a generally planar working surface 34 and a plurality of spaced apart, recessed, ways 36 which extend parallel to the x-axis 24 of the coordinate system. As seen in FIG. 1, the ways are preferably of a cruciform cross section.

As seen in FIGS. 1 and 4, the base member 30 is also provided with a plurality of bores 38 which extend between the working surface 34 and the chamber 32. Also, a plurality of first tooling stop members 40 are fixed on the base member 30 and, as seen in FIG. 3, are engageable by the work piece 22 to thereby define its position on the holding fixture along the y-axis 26. A plurality of positioning members 42, generally of cruciform cross section, are slidably received in their respective ways 36 of the base member 30. The positioning members 42 are movable between rest positions, indicated by those members which are farthest to the right relative to the base member 30 as illustrated in FIG. 1, and active positions which will be described in greater detail below. As with the base plate 30, each of the positioning members 42 is hollow so as to define a cavity therein. The cross section of a positioning member is generally similar to that illustrated in FIG. 4 with respect to the base member 30. As with the base member 30, each of the positioning members 42 has a working surface 44 which is generally coplanar with the working surface 34 of the base member 30. Continuing with the similarity between the positioning members 42 and the base member 30, each of the positioning members is formed with a plurality of bores 38 which extend between the working surface 44 and its associated cavity.

A plurality of vacuum hold down members 46 are slidably received within the bores 38 of both the base member 30 and the positioning members 42. As best seen in FIG. 4, the hold down members 46 are tubular and terminate at an outer rim 48. The hold down members 46 are movable along the z-axis 28 between a retracted position (as illustrated by the left and right members in FIG. 4) such that the outer rim 48 is generally flush with the working surface 34, or the working surface 44, as the case may be. The term "generally flush" is taken to mean that the rim 48 or any additional elements thereon have an elevation no greater than the working surfaces 34 and 44 and, indeed, may be recessed relative to the working surfaces. Additionally, the hold down members 46 can be moved to extended positions spaced from the bores 38 and from the working surfaces 34 and 44 as indicated by the middle member in FIG. 4. As schematically represented in FIG. 4, finger members 50 are threadedly engaged with a lower rim 52 of the hold down members 46 and by means of a suitable mechanism (not shown) can move the hold down members 46 up and down from a retracted position to a fully extended position or to any desired intermediate position. As illustrated in FIG. 1 a plurality of the hold down members 46 are extended to appropriate positions to supportingly engage the work piece 22 on the fixture 20. By so doing, the hold down members define the position of the work piece 22 in the direction of the z-axis 28 at a plurality of spaced locations along the directions of the x- and y-axes, 24 and 26, respectively.

Second tooling stop members 54 are mounted on each of the positioning members 42 adjacent an end thereof.

As each of the positioning members 42 is moved axially within its associated way 36 toward the workpiece 22 (see FIG. 3), further movement of each positioning members 42 is prevented or interrupted by engagement of a stop member 54 with the work piece. In this manner, a plurality of stop members 54 thereby define the position of the work piece along the x-axis 24 at a plurality of locations along the y-axis 26.

The system disclosed utilizes vacuum on the order of approximately 28+ inches of mercury (Hg) in order to achieve the results desired. Such vacuum from any suitable source is provided to the chamber 32 of the base member 30 and to the cavity of each of the positioning members 42 by means of the conduits 56.

With reference to FIG. 4 it is seen that the middle hold down member 46 is connected to the vacuum within the chamber 32, the member 46 being in the extended position. In an opposite fashion, the hold down members 46 being in fully retracted positions are disconnected from the vacuum. This results by reason of the fact that their lower rims 52 engage a resilient surface 58 of a suitably mounted plate 60 within the chamber 32. The engagement of the rim 52 with the resilient surface 58 acts as a valve to disconnect the hold down members 46 from the vacuum within the chamber. It will be appreciated that the finger members 50 are slidably received through suitable openings 62 in the plate 60 but are snugly received through openings 64 in the resilient surface 58 to assure the vacuum integrity of the chamber 32. As previously explained, the same construction exists within the cavity of each of the positioning members 42.

It may be desirable to use the holding fixture 20 in combination with numerically controlled machine tools such that information concerning the positioning and shape of the work piece 22 can be determined by the holding fixture and transmitted to the computer operating the machinery. In order to improve the ease of transmitting the information from the holding fixture 20 to the computer, it is preferred that the bores 38 in the base member 30 and in each of the positioning members 42 be equally spaced from one another to form a substantially regular matrix aligned with the axes 24 and 26, respectively, when each of the positioning members is in the rest position. In this manner, changes from the normal or rest position of the fixture 20 can be readily determined and transmitted.

With reference once again to FIG. 4, it has been found preferable to provide a first seal member in a outer rim of each of the hold down members 46 for resiliently and sealingly engaging the work piece 22 when supported on the fixture 20. The seal member 63 may be an o-ring or of other suitable deformable plastic material to prevent marring of the work piece and to permit the hold down members to conform to the shape of the work piece members. In this manner, the large suction force required to hold the work piece to the rims of the hold down members is thereby assured.

With continued reference to FIG. 4, a second seal member 64 which may also be an o-ring, is fixedly mounted in each bore 38 and in rubbing engagement with the hold down members 46 to assure the vacuum integrity of the chamber 32.

Turning once again to FIG. 1, a plurality of spaced, tapped holes formed on the outer surface of the base plate 30 and aligned with the x-axis 24 are provided for threadedly receiving lower ends of the first tooling stop members 40. Similarly, each of the positioning members is provided with a tapped hole to threadedly receive the second tooling stop members therein. While the first stop members 40 are illustrated as being cylindrical in shape and, as such, may be preferable for use with some work pieces, they can be formed of other shapes which may be more suitable for other work pieces. Similarly, while the second stop members 54 have been illustrated as being spherical and, as such, may be preferable for some work pieces, the invention need not be limited to that shape for the second stop members and another shape may be preferable for other work pieces.

While a preferred embodiment of the invention has been disclosed in detail, it should be understood by those skilled in the art that various modifications may be made to the illustrated embodiment without departing from the spirit and the scope thereof as described in the specification and defined in the appended claims.

I claim:

1. A holding fixture capable of positioning an irregularly shaped article in a cartesian coordinate system and for holding the article immobile to enable machining operations to be accurately and repeatedly performed on successive articles comprising:

a base member being hollow to define a chamber therein and having a first working surface and a plurality of spaced apart, recessed, ways extending parallel to an x-axis of the coordinate system, said base member having a plurality of first bores extending between said working surface and the chamber and including first stop means fixed on said base member engageable by the article for defining a position of the article along a y-axis of the coordinate system;

a plurality of positioning members, each being slidably received in said ways and movable between a rest position and active positions, each of said positioning members being hollow to define a cavity therein and having a second working surface generally coplanar with said first working surface of said base member and a plurality of second bores extending between said second working surface and the cavity;

a plurality of vacuum hold down members slidably received within said first and second bores, said hold down members being tubular and terminating at an outer rim, each of said hold down members being movable in a direction parallel to the z-axis of the coordinate system between a retracted position with said outer rim being generally flush with said first and second working surfaces and an extended position spaced from said first and second bores and said working first and second surfaces, said outer rims of a predetermined pluality of said hold down members adapted to supportingly engage the article thereon for defining the position of the article in the z-direction at a plurality of spaced locations parallel to the z- and y- axes of the coordinate system;

second stop means mounted on each of said positioning members, movement of each of said second stop means being interrupted by engagement with the article when said associated positioning member is slid along said way toward the article supportingly engaged on said hold down members, said plurality of said second stop members thereby defining the position of the article in the x-direction at a plurality of spaced locations in the y-direction of the coordinate system; and a source of vacuum to the chamber and to the cavity;
said hold down members being connected with the vacuum when said hold down members are in said extended position to thereby hold immobile the article supportingly engaged thereon, said hold down members being disconnected from the vacuum when said hold down members are in said retracted positions.

2. A holding fixture as set forth in claim 1 wherein said first and second bores are equally spaced from one another and form a substantially regular matrix aligned with the x- and y-axes, respectively, when each of said positioning members is in said rest position.

3. A holding fixture as set forth in claim 1 including first seal means mounted in said outer rim of each of said hold down members for resiliently and sealingly engaging the article supportingly engaged thereon.

4. A holding fixture as set forth in claim 1 including second seal means mounted on said base member and on said positioning members and engageable with said hold down members for assuring the vacuum integrity of the chamber and of the cavities, respectively.

5. A holding fixture as set forth in claim 1 wherein said first stop means includes a plurality of spaced holes tapped in said outer surface of said base plate and being aligned with the x-axis and first tooling stops threadedly engaged with the tapped holes.

6. A holding fixture as set forth in claim 5 wherein each of said first tooling stops is in the shape of a right cylinder.

7. A holding fixture as set forth in claim 1 wherein said second stop means includes a hole tapped in said outer surface of each of said positioning members and a second tooling stop threadedly engaged with each of the tapped holes.

8. A holding fixture as set forth in claim 7 wherein each of said second tooling stops is spherical in shape.

* * * * *

UNITED STATES PATENT AND TRADEMARK OFFICE
CERTIFICATE OF CORRECTION

PATENT NO. : 4,640,501
DATED : February 3, 1987
INVENTOR(S) : David A. Poland

It is certified that error appears in the above-identified patent and that said Letters Patent is hereby corrected as shown below:

In claim 1 at column 6, line 52, delete "working first and second surfaces" and substitute -- first and second working surfaces --.

Signed and Sealed this

Eighteenth Day of August, 1987

Attest:

DONALD J. QUIGG

Attesting Officer      Commissioner of Patents and Trademarks